United States Patent Office 3,345,449
Patented Oct. 3, 1967

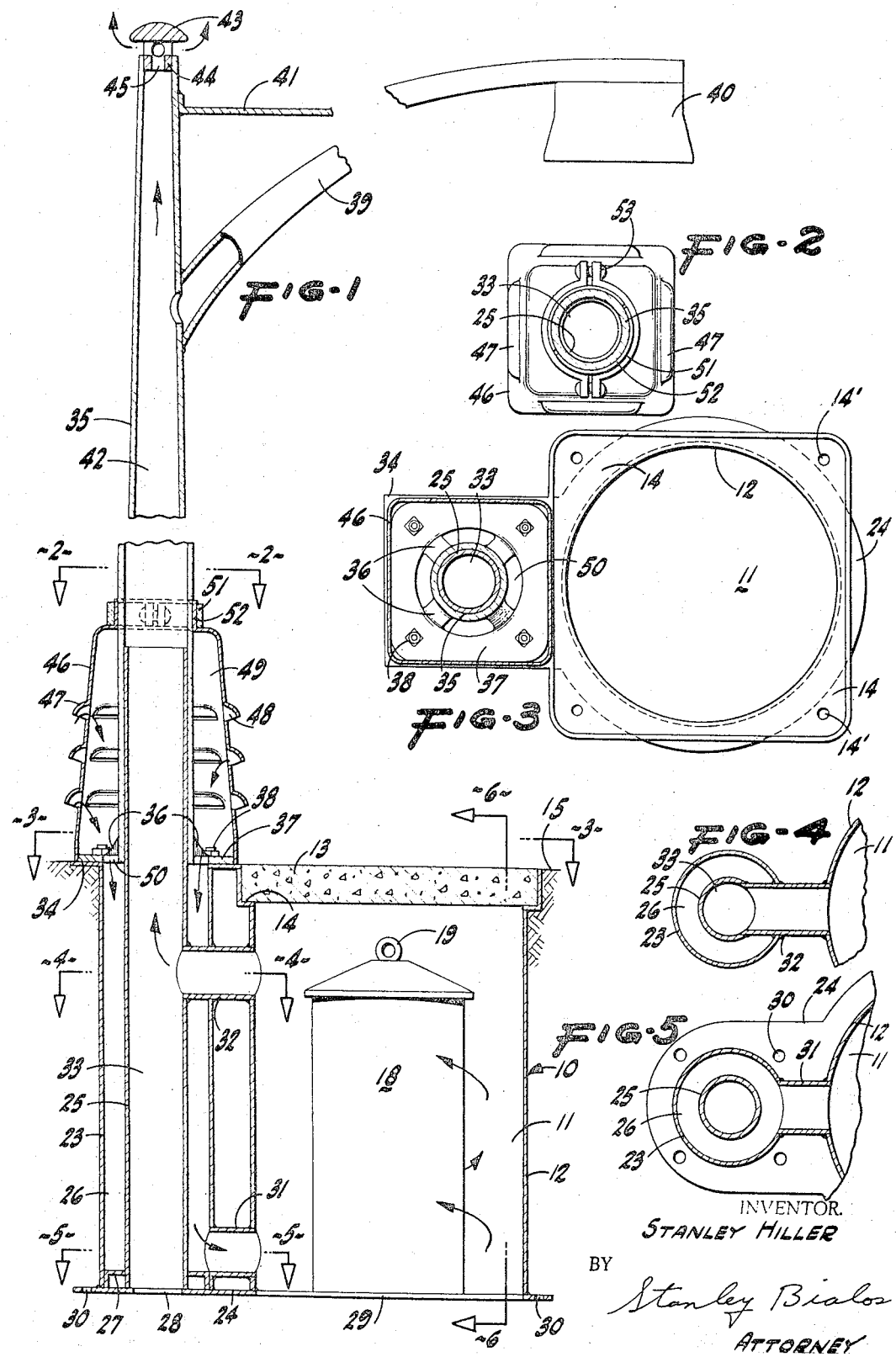

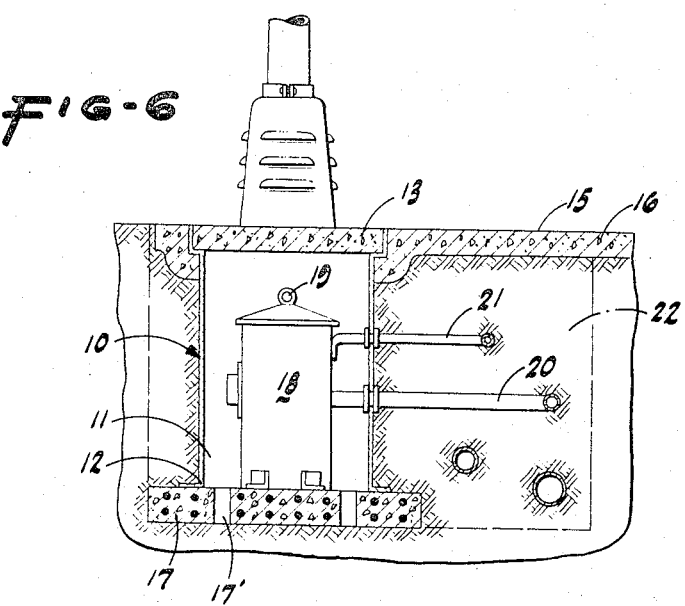
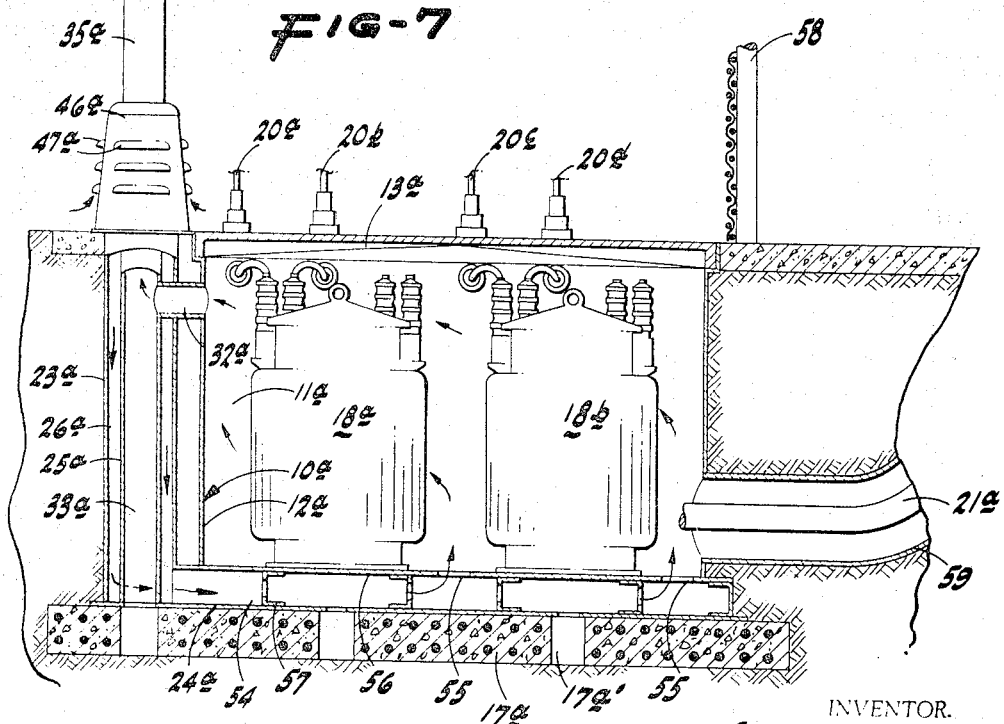

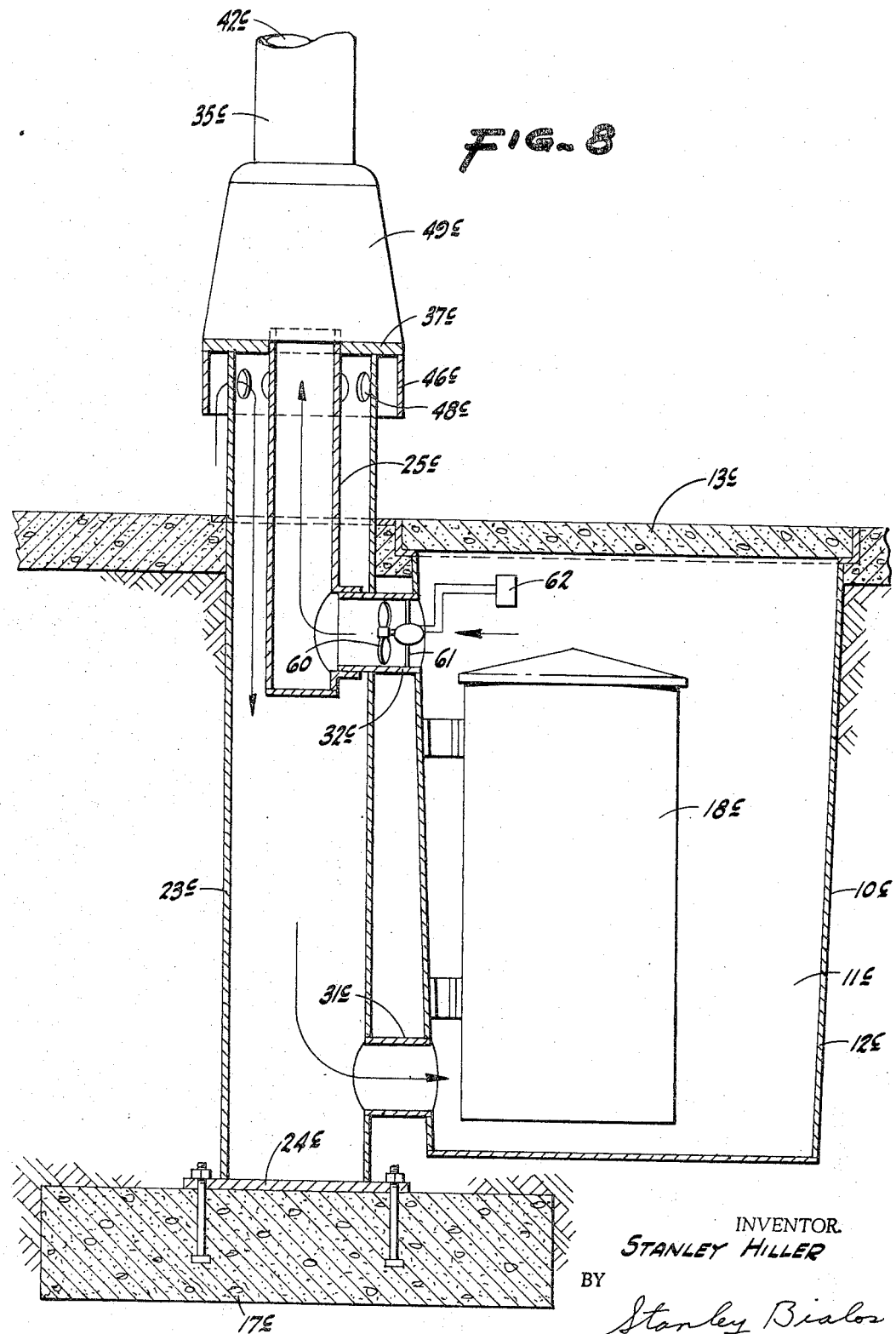

3,345,449
SYSTEM FOR CONCEALING AND COOLING
ELECTRIC TRANSFORMERS
Stanley Hiller, 1 Hiller Drive,
Berkeley, Calif.
Filed July 12, 1965, Ser. No. 471,278
4 Claims. (Cl. 174—16)

ABSTRACT OF THE DISCLOSURE

Apparatus for concealing electric power transformers in an underground vault and for cooling the transformers by inducing a circulation of ambient air through the vault and about the transformers located therein. The apparatus involves use of a hollow light pole provided at its upper end with a discharge port through which air is discharged to atmosphere after being circulated through the vault. An inlet opening provided adjacent the lower end of the light pole communicates with the interior of the vault to supply ambient air thereto.

---

This application is a continuation-in-part of copending patent application Ser. No. 415,309, filed Dec. 2, 1964, and now abandoned.

This invention relates to a system for concealing electric power transformers and for cooling the same, and it relates more particularly to a method of and apparatus for concealing an electric power transformer within an underground enclosure and for cooling the transformer essentially without the expenditure of significant quantities of energy therefor. The invention has utility, for example, in power distribution systems especially for residential areas.

Utilizing high voltage alternating current for the transmission of electric energy, as is the practice today, necessitates the provision of stepdown transformers at or near the points of power use because the exceedingly high voltages employed for power transmission (e.g., 240,000 volts, in some instances) cannot be utilized directly by conventional electric equipment. Consequently, the common procedure is to reduce such high voltages to much lower values at an appropriately located power distribution station which serves a general area comprising a rather large number of users, and then to further reduce the voltage to the customary 110–220 volt value that constitutes the potential of the electric power delivered to residential units and many commercial buildings.

This last reduction in voltage to the values supplied to the convenience outlets of residential buildings is accomplished by relatively small capacity transformers which are very closely located to the points of use. For example, a stepdown transformer of this type may serve about eight single-family residential units and, accordingly, there may be as many as one or more transformers per block depending, of course, on the concentration of such residential units. The power distribution stations are strategically located so as to serve much larger geographical areas than such small capacity transformers and, therefore, the equipment located at such stations is quite large, and it is customary to fence such stations to protect the equipment and also to keep potential trespassers away from the high voltages present thereat.

In the past, the large transformers used at the power stations have been located above the ground and are openly exposed to ambient air which is thereby used for cooling purposes. Similarly, the smaller transformers that serve a restricted number of residential units also are exposed to open view in that they are usually hung on utility poles adjacent the upper ends thereof, or in the case of underground service, they are sometimes positioned on top of the ground usually within a protective casing therefor. Although such positioning of the transformers in open view is esthetically undesirable, it has served a utilitarian function in the sense that the ambient air moving thereabout is used to dissipate the heat generated by the transformers which, as is well known, is significant.

In this respect, it may be noted that the efficiency of a transformer is materially affected in an adverse sense by increasing temperature. That is to say, as the temperature of an electric transformer increases, the current-carrying capabilities thereof and, therefore, its efficiency decreases. This phenomenon is well known as is the heat generating characteristics of transformers, and the reasons therefor need not be considered herein.

In view of the foregoing, an object of the present invention is to provide an improved power distribution system in which at least certain of the distribution transformers and the containers therefor are concealed or hidden from view.

Another object is that of providing a means of cooling a power distribution transformer by establishing a flow of air thereabout without expending substantial quantities of energy specifically for such purpose e.g., to operate a large capacity fan or blower.

Still another object is in the provision of an enclosure defining a space receiving such power transformer therein such enclosure being provided with an entrance opening by means of which air is admitted into the space for circulation about the transformer therein, and which enclosure is associated with an elongated stack extending upwardly from a point of communication within the space to a discharge outlet above such entrance opening, whereby a flow of air is provided into and through such space and outwardly therefrom through the stack for escape from the discharge port thereof.

A further object is to provide an enclosure and cooling arrangement of the type described in which the enclosure is in the form of an underground vault or container defining a substantially closed chamber, an upwardly extending light pole being located adjacent the vault and defining a stack communicating adjacent its lower end with such chamber and being provided adjacent its upper end with a discharge port, and the chamber having a ventilation inlet communicating therewith and opening to atmosphere generally along the base of the pole; the pressure differential defined between such ventilation inlet opening and the discharge outlet as a consequence of the difference of heights therebetween and of the elevated temperature of the air within the stack, relative to ambient air temperature, being effective to enforce a flow of cooling air through such compartment and about a transformer mounted therein.

Additional objects and advantages of the invention will become apparent as the specification develops.

Embodiments of the invention are illustrated in the accompanying drawings in which:

FIGURE 1 is a vertical sectional view taken essentially through the center of a structural assemblage embodying the invention, the support pad for the assemblage (shown in FIGURE 6) being omitted for clarity of detail;

FIGURE 2 is a transverse sectional view taken along the plane 2—2 of FIGURE 1;

FIGURE 3 is a transverse sectional view taken along the plane 3—3 of FIGURE 1 with the cover of the enclosure removed;

FIGURE 4 is a broken transverse sectional view taken along the plane 4—4 of FIGURE 1;

FIGURE 5 is a broken transverse sectional view taken along the plane 5—5 of FIGURE 1;

FIGURE 6 is a broken vertical sectional view in reduced scale taken generally along the line 6—6 of FIGURE 1;

FIGURE 7 is a broken vertical sectional view illustrating a modified arrangement; and FIGURE 8 is a vertical sectional view similar to that of FIGURE 1, of a further modified construction.

The structural assemblage illustrated in FIGURE 1 includes an enclosure, generally designated with the numeral 10, defining a space 11 therewithin. The particular enclosure 10 is in the form of a casing or vault having a perimetric side wall 12 of annular configuration and a removable cover 13 supported within an annular seat 14 defined by the side wall 12 adjacent the upper end thereof. Thus, in the structure shown, the space 11 is a chamber or compartment that is substantially closed except for certain inlet and outlet openings which will be described in detail hereinafter.

The enclosure 10 is located within the ground and entirely below the upper surface thereof—the elevation of which is indicated in FIGURES 1 and 6 by the line 15 which is substantially coextensive with the upper surface of the cover 13. Actually, as shown best in FIGURE 6, the surface level 15 may be defined by a concrete sidewalk 16, and in such event, the cover 13 may form a part of such sidewalk and be made of concrete as illustrated, although any other material—metal, for example—may be used. Since the cover 13 is removable, tool-accepting recesses or openings (not shown) will be provided therein to facilitate removal thereof. To prevent inadvertent removal, fasteners in the form of studs may extend through openings 14' in the seat 14 and through openings aligned therewith in the cover to releasably anchor the cover in position within the seat.

The perimetric side wall 12 of the enclosure 10 is metal in the embodiment illustrated, but it can be made of any other suitable material such as, for example, concrete. In this connection, as shown in FIGURE 6, the bottom of the enclosure is formed by a pad 17 of reinforced concrete which is of sufficient thickness and strength to support a relatively heavy transformer 18 thereon. The transformer in the usual case will be anchored to the pad 17 as by means of studs appropriately imbedded therein so as to prevent shifting of the transformer due to vibration incident to the operation thereof. The pad 17 may have one or more drain openings 17' therein to enable any moisture collecting in the space 11 to escape therefrom.

The transformer 18 may be a completely conventional unit, the size and capacity of which will depend upon the number of residential units to be served thereby which will dictate the requisite power output therefor. As is well known, power transformers of this type have the primary and secondary windings thereof and necessarily associated components located within a protective casing which provides a substantially moisture impervious barrier therefor. Depending upon the capacity of the transformer, such casing (which is usually of metal) may or may not be equipped with fins to facilitate the dissipation of heat into the fluid medium thereabout, usually air. The particular transformer shown is equipped at the upper end thereof with an eye 19 adapted to receive a hook therein which is used in lowering the transformer into the space 11 and for removing the transformer therefrom should removal thereof be required.

Transformers of the type that may be used are manufactured by several of the well known companies supplying electric power equipment, and irrespective of the particular model, and size, high voltage power will be brought thereto through a primary circuit indicated by the conductor 20 (FIGURE 6) and the lower voltage output will be taken therefrom via a secondary circuit indicated by a conductor 21. In the arrangement shown in FIGURE 6, insulation grommets are used to isolate the conductors 20 and 21 from the metal wall 12 of the enclosure 10, and such conductors are shown in association with a back-filled utilities trench generally indicated at 22, the details of which are disclosed in my copending patent application, Ser. No. 215,711, filed Aug. 8, 1962 and entitled "Utilities System" now Patent No. 3,263,577.

Associated with the enclosure 10 is a ventilation system which includes a shell 23 of cylindrical configuration located adjacent the enclosure 10 and essentially below the ground level 15. The shell 23 is rigidly affixed adjacent the lower end thereof, as by means of welding, to a base plate 24 which also seats the perimetric wall 12 of the enclosure 10 thereon and is welded or otherwise rigidly related thereto. A tube 25 is coaxially mounted within the shell 23 and is of substantially smaller diameter so that an annular space 26 is defined therebetween. The tube 25 at its lower end also seats upon the base plate 24 and the spacing between the shell 23 and tube 25 is fixedly established by a spacer 27 in the form of an annulus having an L-shaped configuration in cross-section.

The base plate 24 has an opening 28 formed therein in alignment with the tube 25 so that any moisture entering the tube can escape from the lower end thereof and, similarly, an opening 29 is provided in the base plate that is substantially coextensive in diameter with the perimetric wall 12 of the enclosure 10 and is in substantial alignment therewith. The base plate 24 may be provided with a plurality of apertures 30 therein respectively adapted to pass studs therethrough which are used to secure the entire assemblage to the pad 17.

As shown in FIGURES 1 and 5, a flow passage provided by a tube 31 extends between the perimetric wall 12 of the enclosure 10 and the shell 23 to establish flow communication between the annular space 26 defined within the shell 23 and the interior or space 11 defined by the enclosure 10. In terms of function, as will be described hereinafter, the tube 31 defines an inlet opening through which cooling air is admitted into the space 11. As seen in FIGURES 1 and 4, a flow passage provided by a tube 32 extends between the perimetric wall 12 of the enclosure 10 and the tube 25 to establish flow communication between the bore or flow passage 33 defined within the hollow tube 25 and the interior or space 11 of the enclosure 10. In terms of function, the tube 32 defines an outlet opening through which cooling air is discharged from the space 11.

At its upper end, the shell 23 is provided with an outwardly extending flange 34 that is fixed with respect to the shell 23 and also with respect to the wall 12 of the enclosure 10 to rigidly relate the same. The upper surface of the flange 34 is substantially coextensive with the ground level 15, and it will be noted in FIGURE 1 that the tube 25 extends upwardly for a substantial distance above the flange 34. Telescopically circumjacent such upper end portion of the tube 25 is a hollow standard 35 having rigidly secured to the lower end thereof, by means of reinforced gussets 36, a generally planar, laterally extending flange 37 that seats upon the flange 34 and is secured thereto by a plurality of bolts or studs 38. The standard 35 is in the form of a light pole and is provided along the upper portion thereof with an outwardly extending arm 39 equipped at its outer end with a lamp or light fixture 40. A bracket 41 extending between the pole 35 and arm 39 may be used to brace the latter.

The arm 39, which is welded or otherwise rigidly secured to the pole 35, is hollow and opens to the interior of the pole 35. Thus, the wires necessary to energize the source of light within the fixture 40 are brought thereto through the interior of the pole 35 and interior of the arm 39. Such conductors are not shown since they form no part of the present invention.

As stated, the standard or pole 35 is hollow and has a longitudinally extending flow passage 42 therethrough—the upper end of which is partially closed by a shield 43 which is equipped with a plug 44 that seats within the open upper end of the passage 42 and has an aperture 45 formed therein. The shield 43 prevents rain and other moisture from directly entering the interior of the pole 35, and the opening through the shield defines a discharge outlet through which cooling air is afforded an escape to atmosphere.

Surrounding the lower end portion of the pole 35 is a casing 46 equipped with a plurality of louvers 47 each of which defines an air inlet opening 48. The casing 46 surrounds the flange 37 of the pole 35, as shown in FIGURES 1 and 3, and seats upon the flange 34 of the shell 23. The hollow interior 49 formed by the casing 46 about the pole 35 is in open communication with the annular space 26 between the shell 23 and tube 25 through arcuate openings 50 defined between the gussets 36 connecting the flange 37 to the pole 35. In the specific structure shown (see FIGURE 3), there are four such arcuate openings 50 equally spaced from each other by the four intervening gussets 36. The casing 46 is secured in the position illustrated by a segmented clamp 51 that surrounds an upwardly extending collar 52 provided by the casing 46 in coaxially circumjacent relation with the pole 35. The two symmetrical sections of the clamp 51 may be snugly secured about the collar 52 by fastener structure 53 such as rivets or bolts.

Evidently, a flow system is defined through the louver openings 48, interior 49 of the casing 46, arcuate openings 50, annulus 26, and flow conduit 31 into the space 11, and outwardly therefrom through the flow conduit 32, connecting passages 33 and 42, and aperture 45 in the shield 43. The inlet opening by means of which air is admitted into the flow system is defined by the louver openings 48, and such inlet is disposed adjacent the lower end portion of the pole 35 essentially at ground level. On the other hand, the outlet opening of the flow system is defined by the aperture 45 in the shield 43, and such opening is disposed adjacent the upper end of the pole 35 which is at a significantly greater elevation than the inlet opening formed by the louvers 47. Accordingly, the pole 35 and tube 25 telescopically related therewith define a stack or flue in flow association with the space 11.

Consequently, cooling air is caused to flow inwardly, into the space 11 adjacent the lower end thereof through the conduit 31 and upwardly therethrough about the transformer 18, and then outwardly from the space adjacent the upper end thereof through the conduit 32 for discharge to atmosphere through the aperture 45 in the shield 43 located at the upper end of the pole 35. Such flow of air is effective to cool the transformed 18 by dissipation or transfer into the air of the heat developed by the transformer, and it is obtained in this structure without the direct expenditure of energy (that is, fans, pumps, etc., are not required).

Such induced flow of cooling air results from the pressure differential defined between the lower-located air inlet opening formed by the louvers 47 and upper-located discharge outlet formed by the aperture 45 in the shield 43. This pressure differential is due essentially to at least two factors: one constitutes the static pressure difference caused by the difference in elevation between the inlet and outlet openings (which static pressure difference for any particular installation is usually constant); and the other results from the elevated temperature of the air within the stack (relative to ambient air temperature) which is caused primarily—although not necessarily entirely—by heat exchange from the transformer 18 to the air flowing therepast. As a consequence of this last factor, the draft or rate of flow of cooling air through the space 11 is automatically related to the cooling requirement of the transformer, with the result that a greater flow of cooling air occurs when the transformer temperature is elevated than when the temperature is at a lower value.

More particularly, consider that as the temperature of the air flowing upwardly through the stack increases, such air in being unconfined (the stack is open) necessarily expands in accordance with the well known gas laws and the density thereof decreases. Accordingly, for any increase in the temperature of the stack air with respect to ambient temperature, the pressure at the outlet 45 will correspondingly decrease relative to the pressure at the inlet (louvers 47); and, therefore, there will be an increase or enlargement of the differential between the pressures at the inlet and outlet which will cause a greater movement of air to be induced through the space 11. Now then, since the temperature of the air flowing upwardly through the stack is related to the temperature of the transformer 18 because the air is heated thereby, it is therefore apparent that the higher the operating temperature of the transformer, the greater will be the transfer of heat therefrom to the air (assuming the ambient temperature remains about the same), the higher will be the temperature of the air flowing upwardly through the stack. Accordingly, there will be a corresponding enlargement or increase in the pressure differential between the inlet and outlet of the flow system and a greater flow of air will be induced therethrough.

Further, the transformer 18 is enclosed within the space 11 and to a great measure is shielded from ambient temperatures by the enclosure 10 which, as shown in FIGURE 1, is in the form of a vault buried within the ground. Thus, the sun cannot bear directly on the transformer 18, and the temperature thereof will not be continuously elevated by direct exposure to the sunlight as is the usual case when the transformer is conventionally located. However, other parameters being constant, the transformer may tend to operate at a somewhat higher temperature on warmer days than on cooler days because of the associated higher ambient air temperatures. That is to say, the rate of heat exchange between any two bodies depends upon the temperature difference therebetween. Consequently, when the temperature of the ambient air drawn into the space 11 is high, there will be a tendency for a lesser transfer of heat to any particular volume of air from the transformer 18 than when the temperature of the air is lower.

However, in the arrangement being considered, automatic compensation is provided for such tendency toward a lesser heat transfer from the transformer and into the air flowing thereover, because the temperature of the stack will be higher on a warm day as a consequence of the higher ambient air temperature and also because of the greater intensity of the sun shining thereon. In view of this, the temperature of the air flowing upwardly through the stack will be elevated because of the heat exchange relationship of such air flow with the wall of the stack (that is, with the wall of the pole 35), whereupon the expansion of the air that accompanies such higher temperature thereof will further reduce the pressure at the outlet 45 and a greater flow of air will therefore be induced through the space 11. As a consequence, although there is a tendency toward a lesser exchange of heat from the transformer to a given volume of air because of the smaller temperature differential therebetween, the increased rate of flow of air provides a greater flow volume and greater dissipation of heat from the transformer. Accordingly, there is an automatic compensation in the system that results in an increased cooling effect whenever ambient temperatures are higher.

The pole 35 is conveniently assembled with the remaining structure by simply telescoping the lower end portion of the pole over the upper end portion of the tube 25, and then tightening nuts onto the studs which respectively extend through openings provided therefor in the flange 37 of the pole. Thus, the system readily accommodates poles of various size and form so long as the lower ends thereof are slidable over the tube 25. The casing 46 is appropriately located at the same time and the collar 52 thereof is simply slipped over the pole 35 before the pole is positioned about the tube 25 and, thereafter, the split clamp collar 51 is fixed about the collar to anchor the same in frictional engagement with the pole. The collar 52 may be appropriately severed at one or more locations thereabout, as shown in FIGURE 2, to facilitate such clamping thereof about such outer surface of the pole.

The tight juxtaposition of the segmented clamp 51 with the collar 52 and of the collar with the pole, materially restricts the amount of moisture that can flow into the compartment 49 defined by the shell and then flow downwardly therefrom through the openings 50 and into the annulus 26. Also, the shell or casing 46 seats about the flange 37 of the pole 35 and this further restricts the amount of moisture than can enter the compartment 49, and the downward and outward configuration of the louvers 47 also minimizes entrance of moisture into the compartment 49. However, any moisture that should enter the annulus 26 can flow outwardly therefrom through the conduit 31 and into the space 11 from which it can drain through the large opening 29 in the base plate 24 and smaller openings 17′ in the support pad 17. Similarly the shield 43 restricts the flow of moisture into the pipe 42, but any moisture that does enter the same can drain therefrom through the opening 28 in the base plate 24.

Access to the interior of the space 11 and transformer 18 mounted therein is provided through the upper end of the enclosure 10 upon removal of the cover 13. The transformer 18 is provided with suitable connectors by means of which the primary and secondary conductors 20 and 21 are electrically connected thereto. In the particular arrangement illustrated in FIGURE 6, such conductors enter the space 11 laterally from the back-filled utilities trench 22 and, therefore, in no way interfere with free access to the space 11.

The modification illustrated in FIGURE 7 is the same in all essentials as the embodiment heretofore described, but represents an arrangement which may be employed advantageously as a distribution station serving a relatively large area which includes a considerable number of the smaller distribution transformers 18. In view of the similarities, the same numerals will be used where appropriate to designate corresponding components, except that the suffix "a" will be added thereto.

Accordingly, a pole 35a defining a flow passage 42a therethrough is arranged with a tube 25a having a flow passage 33a therein that communicates with the passage 42a. The passage 33a is connected through a conduit 32a with a space 11a defined by an enclosure 10a having a perimetric side wall 12a. Mounted within the space 11a are a plurality of power distribution transformers, there being two illustrated which are respectively denoted with the numerals 18a and 18b.

A shell 23a coaxially circumjacent the tube 25a defines an annular space 26a therewith that communicates, as heretofore described, with the interior of a casing 46a which is equipped with a plurality of inlet louvers 47a. Air flows inwardly through such louvers and downwardly through the interior of the casing 46a, through the annulus 26a, and into manifold 54 communicating with the annular space adjacent the lower end thereof. The manifold 54 has a plurality of outlet openings 55 spaced thereabout which permit the flow of air outwardly from the manifold and into the space 11a. The openings 55 are oriented and disposed so that the air flowing therefrom is relatively uniformly distributed about the space 11a for circulation into the heat exchange relation with the transformers 18a and 18b.

The transformers are mounted upon the manifold which is defined in part by a base plate 24a and by a support plate 56 located thereabove. A plurality of C-shaped channels 57 are interposed between the plates 24a and 56 so as to afford sufficient strength for support of the transformers. Such beams are apertured, as shown in FIGURE 7, to permit the free circulation of air through the manifold, and the base plate 24a may be apertured at appropriate locations to permit the escape of moisture through drain openings 17a′ in the reinforced concrete support pad 17a.

The space 11a is provided with a removable closure member in the form of a metal cover 13a that is received within a seat provided by the enclosure 10a adjacent the upper end thereof. The cover or closure 13a can be made of any suitable material, concrete, for example, as in the prior embodiment, but is formed of a strong material such as steel in the particular illustration because it covers a relatively wide opening and a concrete cover having the requisite tensile strength would be excessively heavy. Since the arrangement illustrated in FIGURE 7 represents a power distribution station, a fence 57 is usually present to enclosure the various high voltage mechanisms and connections.

The enclosure 10a and space 11a are located within the ground, as illustrated, so that again the enclosure is in the form of a vault and the space 11a is substantially closed except for the air inlet opening thereto and air outlet opening therefrom. The primary conductors are brought to the transformers from overhead transmission lines and, in the particular illustration, four primary conductors are shown, two for each of the transformers. For purposes of identification, such conductors are denoted 20a, 20b, 20c and 20d. The primary conductors may enter the space 11a laterally of the cover 13a, as shown in FIGURE 7, so as not to interfere with removal and replacement thereof. Also, suitable conduits or shields can be employed to carry the primary conductors into the space 11a so that they may be properly connected with the primary windings of the transformers through appropriate connector structures.

In the arrangement as shown in FIGURE 7, a secondary conductor 21a is shown leaving the space 11a laterally through a conduit 59. The various wires that constitute such conductor 21a are not shown in connection with the transformers 18a and 18b because such omission simplifies the drawing, and the location or locations at which the secondary conductor or conductors leave the space 18a are dependent upon a particular installation. In the form shown, the secondary conductor 21a may lead to the aforementioned back-filled trench 22 to become the aforementioned primary conductor 20 therein.

The arrangement shown in FIGURE 7 functions in precisely the same manner as the arrangement illustrated in FIGURES 1 through 6 and heretofore described and, therefore, it is sufficient to note that cooling air is induced into the space 11a through the louvers 47a, and that such air flows downwardly through the interior of the casing 46a, into the annulus 26a, and then into the manifold 54 for discharge therefrom into the space 11a through the various apertures 55. The air, after passing in heat exchange relation with the transformers 18a and 18b, flows outwardly from the space 11a through the conduit 32a and into the passages 33a and 42a which define a stack or flue, as heretofore described. Accordingly, all of the advantageous features present in the embodiments of FIGURES 1 through 6 are present in the embodiment of FIGURE 7.

The embodiment illustrated in FIGURE 8 is quite similar to the structure illustrated in FIGURE 1, and the essential departure from the prior form resides in the use of a booster fan to augment the flow of air through the transformer chamber. In view of the structural similarities, the same numerals will be used to identify corresponding parts in the FIGURE 8 structure except that the suffix "c" will be added for purposes of differentiation.

Accordingly, such structure includes a transformer 18c mounted within a space or compartment 11c defined by an enclosure 10c in the form of a casing or vault having a perimetric sidewall 12c of annular configuration. The sidewall 12c coverges inwardy and downwardly to provide a somewhat inverted, frusto-conical shape which may be utilized in nesting a plurality of such enclosures to conserve space during shipment and storage. The enclosure is equipped with a removable cover 13c through which access is provided to the space 11c within the enclosure.

The enclosure is located below ground level, as shown, and the space 11c thereof communicates through a tube or flow passage 32c with the interior of a conduit or tube 25c. The space 11c also communicates through a flow passage or tube 31c with an elongated shell 23c of cylindrical configuration which, for the most part, is located below the level of the ground. The shell 23c is rigidly affixed adjacent the lower end thereof, as by means of welding, to a base plate 24c bolted or otherwise mounted upon a concrete pad 17c.

At its upper end and above the ground level, the shell 23c has affixed thereto a plate 37c as by means of welding. Extending downwardly from the plate 37c is an annular skirt 46c which is coaxially circumjacent the upper end portion of the shell 23c. The shell, within the confines of the circumjacent skirt 46c, is provided with a plurality of openings 48c which together define an air inlet opening into the interior of the shell, as indicated by the arrow in FIGURE 8. Also associated with the plate 37c and extending centrally therethrough is the upper end portion of the tube 25c. The tube may project through the plate 37c, as indicated, although the precise structural interrelationship thereof is not critical.

Extending upwardly from the plate 37c is a casing 49c which seats upon the plate and is fixedly secured thereto in any conventional manner such as welding. The casing 49c has a hollow interior in open communication with the tube 25c, and such hollow interior also communicates with the interior 42c of a pole 35c. As in the case of the embodiment shown in FIGURE 1, the pole 35c may be a light pole and, in any event, is provided with an opening adjacent to the upper end thereof through which air flowing upwardly through the pole may discharge to atmosphere. So far as described, then, the embodiment of the invention illustrated in FIGURE 8 is substantially the same as the embodiment thereof shown in FIGURE 1. Therefore, the flow of ambient air is induced into the interior of the shell 23c through the inlet openings 48c, and from the shell into the space 11c through the inlet 31c. The air then passes outwardly from the space 11c through the discharge opening 32c from which it flows upwardly through the interior of the tube 25c, then through the hollow interior of the casing 49c and upwardly through the pole 35c to the upper end thereof where it escapes to atmosphere.

Disposed within the flow path defined between the inlet openings 48c and discharge outlet (not shown) adjacent the upper end of the pole 35c, is a fan or blower 60 that may be used to augment the volume of air flowing through the space 11c and about the transformer 18c. In the embodiment illustrated, the fan 60 (which will include blade structure and a motor drive therefor, and can be a centrifugal fan or blower, a propeller fan, etc.) is located within the tube 32c connecting the interior of space 11c with the interior of the tube 25c. Evidently, the precise location of such fan is to a great extent a matter of choice so long as it is positioned within the flow path to augment the flow of air otherwise enforced through the space 11c as a consequence of the aforedescribed pressure and temperature differentials.

The fan 60 may be wholly conventional, and it is mounted in any convenient manner such as by means of angularly spaced support rods 61 which extend radially outwardly from the motor casing of the fan to the inner surface of the tube 32c. In most instances, the fan blades will be energized by a fractional horsepower electric motor usually having a power capacity of 1/10 horsepower or less. The motor may run continuously or it may be controlled so as to operate intermittently in accordance with the temperature conditions within the space 11c. In this latter respect, a conventional thermostatic control 62 may be appropriately positioned within the chamber 11c to sense contemporaneous temperatures therein. Thus, when the temperature increases above a predetermined value, the fan 60 is energized through the thermostatic control 62 to increase the volume of air moving through the space 11c. Such increased volume of air will cause the dissipation of more heat from the transformer and result in a diminishing of the temperature within the space. Similarly, when the temperature decreases to, or remains below, the aforementioned predetermined value, the thermostatic control 62 will effect de-energization of the fan.

Quite apparently, the fan 60 is operative to augment the natural movement of air into and through the space 11c and, in this respect, permits a transformer of given capacity to carry a larger output load (or a transformer of smaller than normal capacity to carry a fixed load) than would be the case in the absence of such fan because the increased air flow about the transformer will maintain it in a sufficiently cool condition to accommodate such larger than normal load. Alternatively, use of the booster fan 60 will result in less energy loss for a given output load because energy losses incident to the development to heat are reduced as a consequence of the increased temperature-reducing airflow about the transformer.

In some instances, it may be economically desirable to group a plurality of transformers side by side each within its own casing 10 to provide a bank of transformers at a power station rather than to group a plurality of transformers within a single casing as shown in FIGURE 7. Irrespective of whether transformers are grouped within a single casing or are respectively associated with a plurality of casings, the movement of cooling air therepast will be as described hereinbefore. It may be noted that the substantially continuous movement of air through the space 11 and about the transformer, or transformers, mounted therein is effective to prevent significant transformer sweating, thereby obviating to a large measure the requirement for the drainage of moisture from the casings.

While in the foregoing specification embodiments of the invention have been described in considerable detail for purposes of making a complete disclosure thereof, it will be apparent to those skilled in the art that numerous changes may be made in such details without departing from the spirit and principles of the invention.

What is claimed is:

1. In combination, a plurality of electric transformers, each operative to convert a primary voltage to a secondary voltage and having heat developed as a by-product of such conversion, an enclosure defining an underground vault providing a substantially closed space receiving said transformers therein, a stack comprising a hollow post secured to said vault and projecting upwardly therefrom above the ground and being provided with an inlet port establishing flow communication between said space and the hollow interior of the post to accommodate the flow of air thereinto from said space, said stack further comprising a light pole telescopically engaging said post and extending upwardly therefrom and providing a longitudinally disposed flow passage communicating with the hollow interior of said post and having a discharge port adjacent its upper end portion in flow communication with said passage for the escape of air therefrom, and a ventilation inlet system including an inlet opening located adjacent the lower end portion of said pole and an outlet opening connected with said inlet opening and communicating with said space adjacent the lower end portion thereof so that ambient air is induced into said space through said inlet opening and flows outwardly from the space through said hollow post and passage to cool said transformers, said ventilation inlet system further including a manifold also located within said space and communicating with said inlet opening, said manifold being provided with a plurality of spaced apart apertures opening into said space to distribute thereabout the transformers therein the ambient air flowing into said space through said ventilation inlet system, the aforesaid telescopic engagement defined between said pole and post being a removable engagement enabling ready interchange of one light pole with another while establishing a strong support for any such light pole so engaged with said post.

2. The combination of claim 1 in which said manifold comprises a bottom wall portion of said vault and supports said transformers thereon.

3. In combination, a plurality of electric transformers, each operative to convert a primary voltage to a secondary voltage and having heat developed as a by-product of such conversion, an enclosure defining an underground vault providing a substantially closed space receiving said transformers therein, an elongated light pole adjacent said enclosure and extending upwardly above the ground level and above said space and providing a longitudinally disposed flow passage having a discharge port adjacent its upper end portion and an inlet port adjacent the lower end portion thereof in communication with said space and through which air can flow outwardly from said space and upwardly through said flow passage for escape through said discharge opening thereof, and a ventilation inlet system having an inlet opening located adjacent the lower end portion of said pole but above the ground level and an outlet opening communicating with said space, and a manifold located within said space and communiplurality of spaced-apart apertures opening into said cating with said inlet opening and being provided with a space to distribute thereabout and about the transformers therein the ambient air flowing into said space through said ventilation inlet system, the difference in elevation between said ventilation inlet opening and said discharge opening together with any elevation in temperature with respect to ambient temperature of the air within said passage being effective to induce a flow of ambient air into said space through said ventilation inlet system and outwardly from the space through said passage to thereby cool said transformer.

4. The combination of claim 3 in which said manifold comprises a bottom wall portion of said vault and supports said transformers thereon.

References Cited

UNITED STATES PATENTS

| | | | |
|---|---|---|---|
| 415,110 | 11/1889 | Johnson | 174—16 X |
| 424,778 | 4/1890 | Gee | 98—49 X |
| 3,271,710 | 9/1966 | Leonard | 174—38 X |

FOREIGN PATENTS

| | | |
|---|---|---|
| 684,593 | 12/1939 | Germany. |
| 919,829 | 11/1954 | Germany. |

OTHER REFERENCES

Dorfer et al.: German printed application 1,165,708, Mar. 19, 1964, 174–15.

LEWIS H. MYERS, *Primary Examiner.*

H. HUBERFELD, *Assistant Examiner.*

UNITED STATES PATENT OFFICE
CERTIFICATE OF CORRECTION

Patent No. 3,345,449

October 3, 1967

Stanley Hiller

It is hereby certified that error appears in the above numbered patent requiring correction and that the said Letters Patent should read as corrected below.

Column 2, lines 27 and 28, for "therein" read -- therein; --; column 5, line 54, for "transformed" read -- transformer --; column 8, line 20, for "enclosure" read -- enclose --; column 11, line 33, strike out "plurality of spaced-apart apertures opening into said" and insert the same, after "a" in column 12, line 1.

Signed and sealed this 22nd day of October 1968.

(SEAL)
Attest:

Edward M. Fletcher, Jr.
Attesting Officer

EDWARD J. BRENNER
Commissioner of Patents